R. DOLLINGER.
APPARATUS FOR SOLDERING CHAIN LINKS.
APPLICATION FILED SEPT. 28, 1910.
988,553.
Patented Apr. 4, 1911.
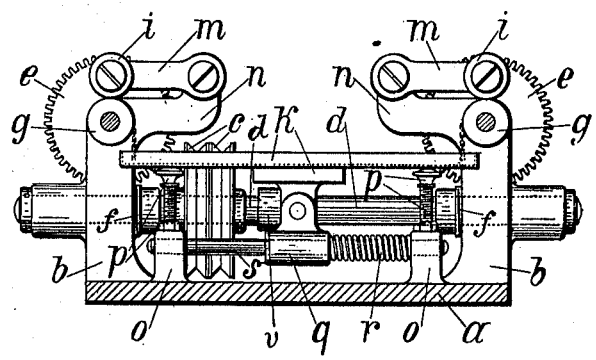
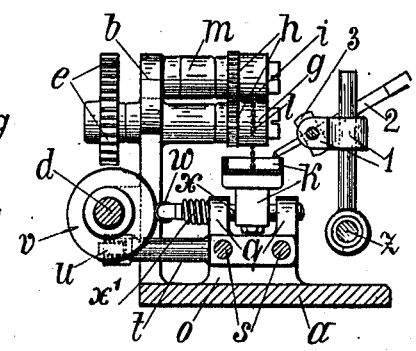
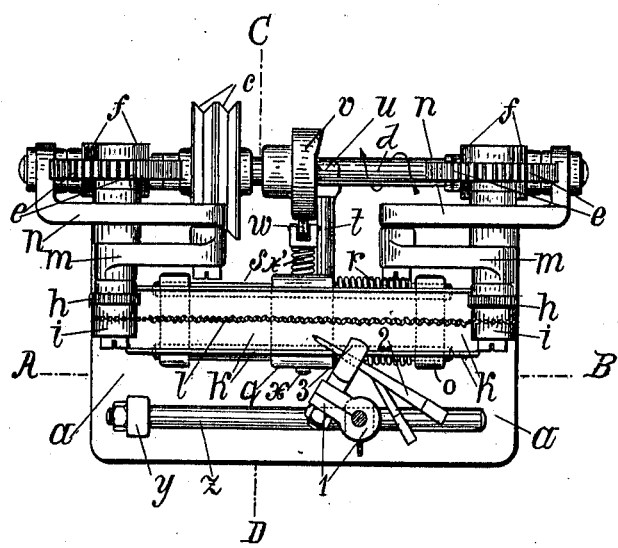
Witnesses:
Inventor:
Richard Dollinger
by
Attorney.

UNITED STATES PATENT OFFICE.

RICHARD DOLLINGER, OF PFORZHEIM, GERMANY, ASSIGNOR TO THE FIRM OF ERNST GIDEON BEK, OF PFORZHEIM, GERMANY.

APPARATUS FOR SOLDERING CHAIN-LINKS.

988,553.  Specification of Letters Patent.  Patented Apr. 4, 1911.

Application filed September 28, 1910. Serial No. 584,200½.

*To all whom it may concern:*

Be it known that I, RICHARD DOLLINGER, a subject of the German Emperor, and residing at Pforzheim, Germany, have invented certain new and useful Improvements in Apparatus for Soldering Chain-Links, of which the following is a specification.

The present invention has reference to improvements in apparatus for continuously soldering together or shutting the abutting ends of chain links made of wire provided with a core of solder, and it relates more particularly to means in connection with such apparatus for vibrating the chain while passing through the soldering zone, for the purpose of preventing adjacent links from becoming intersoldered.

In many of the various known devices for shutting solder-cored chain links, in most of which the chain passes the soldering flame in pendent position, there has been found the great drawback that by reason of the dead weight of the chain the glowing parts are very apt to stretch or distort with consequent widening of the soldering seam or even rupture of the chain. According to the present invention this drawback is effectively obviated by passing the chain during the soldering operation horizontally across a vibrating support, with the effect that the links are so vibrated that the joints are exposed by being shaken out of their ordinary position in the curve of the adjacent links, and are then shut by exposure to a flame without danger of becoming intersoldered with the adjacent links.

One form of apparatus for carrying out my invention is illustrated in the accompanying sheet of drawings, in which—

Figure 1 represents a vertical section through the device on line A—B of Fig. 2. Fig. 2 is a plan view of the apparatus, and Fig. 3 is a vertical section on line C—D of Fig. 2.

On the base plate $a$ are provided the uprights $b$ in which is journaled the shaft $d$ rotated by a suitably driven pulley $c$. At either end of this shaft worm gears $e$ and $f$ are provided, transmitting rotary motion to the lower guide rollers $g$, and by means of the toothed gearing $h$, $h$ to the upper guide rollers $i$, which serve to guide and advance the chain $l$ traveling lengthwise over the support or trough $k$. The upper rollers $i$ are journaled in members $m$ pivoted to brackets $n$ of the uprights $b$, for the purpose of exerting an even pressure on the chain. The support $k$ rests on screw bolts $p$ adjustable in bearings $o$, which latter also serve to loosely journal and guide two parallel rods $s$ clamped in a U-shaped cross-piece $q$; helical springs $r$ surround these rods at one side between the cross-piece $q$ and the respective end bearing $o$. From the cross-piece $q$ extends laterally an arm $t$, whose roller $u$, by reason of the springs $r$, is pressed against the side face of the cam wheel $v$ keyed on the shaft $d$. Upon actuation of the latter, the support $k$ is reciprocated in the direction of travel of the chain. A second arm $x$, with a roller $w$ at its free end, extends from the cross-piece $q$ and is reciprocated by coöperating with the circumferential face of the cam wheel $v$, a spring $x'$ tending to always keep the arm $x$ in contact with the cam wheel. In consequence the support $k$ is reciprocated cross-wise to the travel of the chain.

On a rod $z$, held in the bracket $y$, is adjustably secured the clamp 1 which carries the holder 3 for the blow pipe nozzle 2, so that the flame may be directed to any desired part of the chain resting on the support $k$.

In operation the chain is slowly traveled lengthwise over the support by the roller sets $i$, $g$, and a part of the chain is heated by the flame to the melting point of the solder core, when the abutting link ends are shut in a well-known manner. Owing to the composite shaking motion of the support the link joints are shaken out of their seats in the adjacent links and a soldering together of adjacent links is prevented; at the same time there is no danger of the links spreading or breaking, as is often the case where the chains are being handled in pendent position.

What I claim is:—

1. In apparatus for shutting the joints of chain links, means for horizontally supporting and advancing the concatenated links during the soldering operation, and means for imparting to said supporting means a composite vibratory motion, substantially as set forth.

2. Apparatus for shutting the joints of chain links, comprising in combination, sets of synchronously actuated rollers, a chain support somewhat below and between said rollers, means for reciprocating said support in the direction of its longitudinal axis, means for reciprocating it at right angles thereto, and blow pipe means adjustable relative to said support, substantially as set forth.

3. Apparatus for shutting the joints of chain links, comprising in combination, sets of guide and feed rollers, means for synchronously actuating them, a chain support, spring and cam means for imparting longitudinal vibratory motion to said support, and spring and cam means for imparting to it transverse vibratory motion, substantially as set forth.

In testimony whereof I affix my signature in presence of two witnesses.

RICHARD DOLLINGER.

Witnesses:
GOTTLIEB BIPPOFF,
JOSEPH ROHMER.

Copies of this patent may be obtained for five cents each, by addressing the "Commissioner of Patents, Washington, D. C."